(12) United States Patent
Ergen

(10) Patent No.: US 12,475,803 B2
(45) Date of Patent: Nov. 18, 2025

(54) METHODS AND SYSTEMS FOR DRONE FLIGHTPATH AUTOMATION FOR SITE INSPECTIONS

(71) Applicant: DISH Network L.L.C., Englewood, CO (US)

(72) Inventor: Christopher Ergen, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 349 days.

(21) Appl. No.: 17/894,027

(22) Filed: Aug. 23, 2022

(65) Prior Publication Data

US 2023/0062792 A1 Mar. 2, 2023

Related U.S. Application Data

(60) Provisional application No. 63/236,625, filed on Aug. 24, 2021.

(51) Int. Cl.
| | | |
|---|---|---|
| *G08G 5/00* | (2025.01) | |
| *B64C 39/02* | (2023.01) | |
| *G05D 1/00* | (2006.01) | |
| *G05D 1/10* | (2006.01) | |
| *G08G 5/55* | (2025.01) | |
| *G08G 5/57* | (2025.01) | |

(52) U.S. Cl.
CPC .............. *G08G 5/55* (2025.01); *G05D 1/101* (2013.01); *G08G 5/57* (2025.01); *B64U 2201/20* (2023.01)

(58) Field of Classification Search
CPC ............ B64U 2201/10; B64U 2201/20; B64U 2101/30; B64U 2201/00; B64U 80/82; B64U 70/97; B64U 2101/21; B64U 80/40; B64U 80/00; B64U 40/20; H04W 4/40; H04W 4/46
See application file for complete search history.

(56) References Cited

U.S. PATENT DOCUMENTS

| | | | | |
|---|---|---|---|---|
| 2014/0316616 A1* | 10/2014 | Kugelmass | ............... | G08G 5/26 701/8 |
| 2019/0384283 A1* | 12/2019 | Chowdhary | .......... | G05D 1/0038 |
| 2023/0237795 A1* | 7/2023 | Van Niekerk | .......... | G06V 20/17 382/103 |

\* cited by examiner

*Primary Examiner* — Khoi H Tran
*Assistant Examiner* — Alyse Tramanh Tran
(74) *Attorney, Agent, or Firm* — Perkins Coie LLP

(57) ABSTRACT

A technique is directed to methods and systems for drone flight path automation for site inspections. A user can operate a drone in a sequence around a site and capture data. The data is logged and used to generate an automated flight path, so that for future flights, the drone can fly an automated flight path along the same flight path sequence as the logged flight path and capture data of the site. For example, automated flight paths allow drones to capture data in the same way on each flight so inconsistencies in measured data of the site can be identified, since the flight paths are the same. In some implementations, the captured data is used to generate a three-dimensional (3D) interactive model of the site. The 3D interactive model can be used for acquiring certifications for the site from permitting authorities or inspectors.

20 Claims, 8 Drawing Sheets

METHODS AND SYSTEMS FOR DRONE FLIGHTPATH AUTOMATION FOR SITE INSPECTIONS

CROSS-REFERENCE TO RELATED APPLICATION

This application claims priority to U.S. Provisional Patent Application No. 63/236,625, filed on Aug. 24, 2021, entitled "METHODS AND SYSTEMS FOR DRONE FLIGHTPATH AUTOMATION FOR SITE INSPECTIONS," incorporated herein by reference in its entirety.

BACKGROUND

Network operators can perform inspections at sites, such as inspections on towers or building rooftops. Due to the layout of some sites, a drone is needed to take photos or videos of the site. However, most network operators are not trained to operate a drone to capture the photos or videos of the site.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
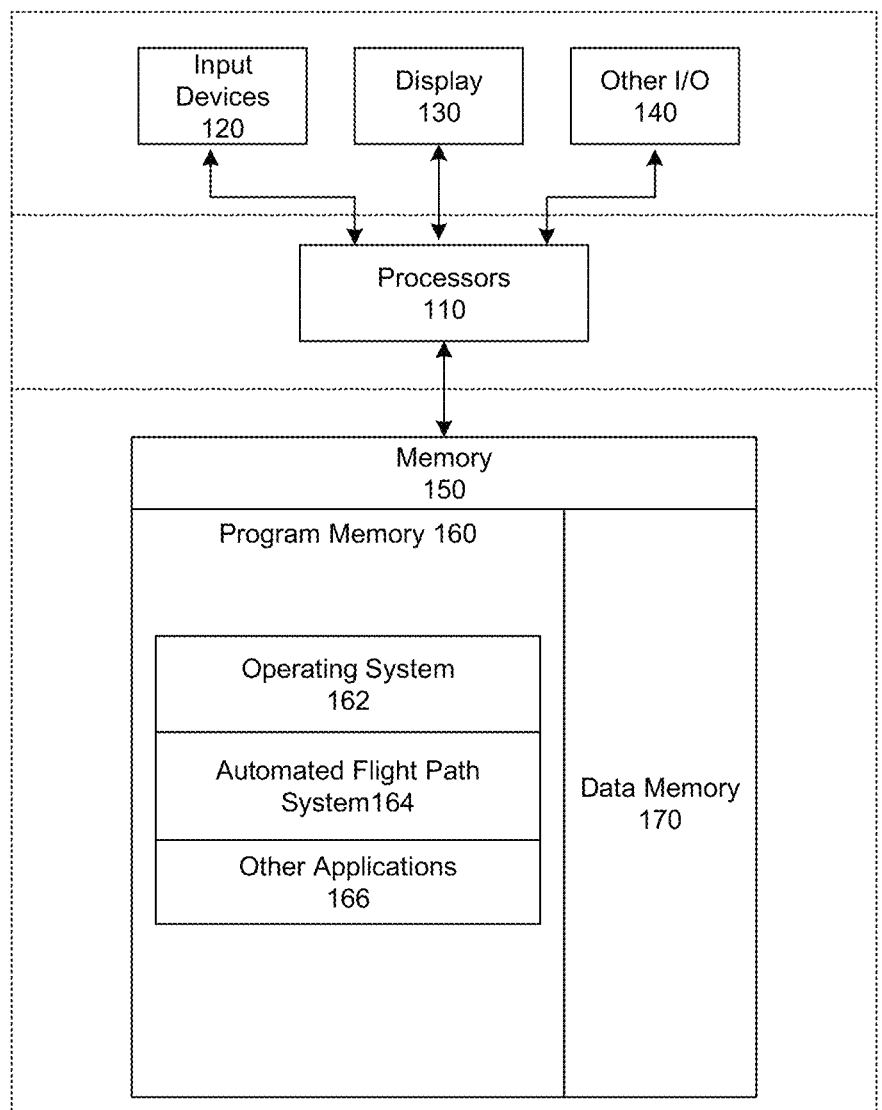
FIG. 1 is a block diagram illustrating an overview of devices on which some implementations can operate.

Aspects of the present disclosure are directed to methods and systems for drone flight path automation for site inspections. Drone pilots can operate drones, from remote locations (e.g., off-site), around a site and capture image data of equipment, site structures, and layout of a site. Sites can include wireless towers, building rooftops, substations, base stations, cell sites, base transceiver stations, or any similar location where wireless communication equipment is located.

In a preferred embodiment, a drone pilot operates a drone in a sequence around a site and captures data (e.g., images, videos, wireless signal measurements, radio frequency signatures of equipment, etc.) and flight path data of the drone navigating around the site. The flight path data is logged and used to generate an automated flight path, so that for future flights, the drone can fly an automated flight path along the same flight path sequence as the logged flight path. The automated flight path allows a drone to capture data of the site from the same positions and angles as previous flight. For example, automated flights allow users to capture data in the same way on each flight so inconsistencies in measured data can be identified, since the flight paths are the same. In another embodiment, the captured data is used for site inspections or site certifications. For example, the captured data is sent to a permitting authority to verify that equipment installed at the site complies with regulations. Automated flights do not require the user (e.g., an untrained technician in physical possession of the drone connected with LTE/5G to their mobile device) to be a trained drone pilot, as the drone travels along an automated flight path without the user operating the drone. In some implementations, the captured data is used to generate a 3D interactive image (e.g., virtual site model) of the site that is used for acquiring certifications of the site from permitting authorities. For example, the captured data is compared to proposed site plans to determine any difference between the proposed site plan and what is physically at the site after construction or installation of equipment. When the captured data is within a predefined tolerance to the proposed site plan, the site can receive a certification.

In existing site inspection systems with drones, users are unable to consistently capture site data, as each drone flight has a different flight path as each drone pilot navigates the drone around the site. The present embodiments of the automated fight path system direct a drone flight along a first flight path and capture a set of data describing one or more attributes about the wireless communication site. Data representing an automated flight path and starting position is generated based on the drone flight path and stored for future flights. The automated flight path system performs future flights of drones, using the stored starting position and automated flight path data, and captures site data during the flight along the automated flight path. The automated flight path system uses coordination between multiple disparate computing systems (e.g., drone data sources, user device data sources, systems for obtaining image data and creating automated flight paths, permitting authority systems, integrations with construction drawing systems, and user devices) to provide a new way to virtually inspect sites and receive authorization for construction or the installation of equipment at sites. In addition, the technical processes used in the disclosed automated flight path system can provide 1) increased virtual access to sites, such as towers or rooftops, by creating a 3D interactive image of the site that can be accessed via a web browser; 2) reduced physical site visits by users; 3) increasing user safety by reducing site visits; 4) reducing the need for trained drone pilots to operate drones; 5) streamlined construction process by using the image data or virtual representation of the site to create construction drawings; and 6) detecting differences in measurements between flights by using the same flight path for each flight. The present embodiments provide a tool for site inspections, site measurements of equipment, utility coordination, a tool for jurisdiction zoning review (e.g., fire department), data management of inventory, site maintenance, or site security.

Several implementations are discussed below in more detail in reference to the figures. FIG. 1 is a block diagram illustrating an overview of devices on which some implementations of the disclosed technology can operate. The devices can comprise hardware components of a device 100 that manage entitlements within a real-time telemetry system. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automated flight path system 164, and other application programs 166. Memory 150 can also include data memory 170, entitlement data, user data, retrieval data, management data, authorization token data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
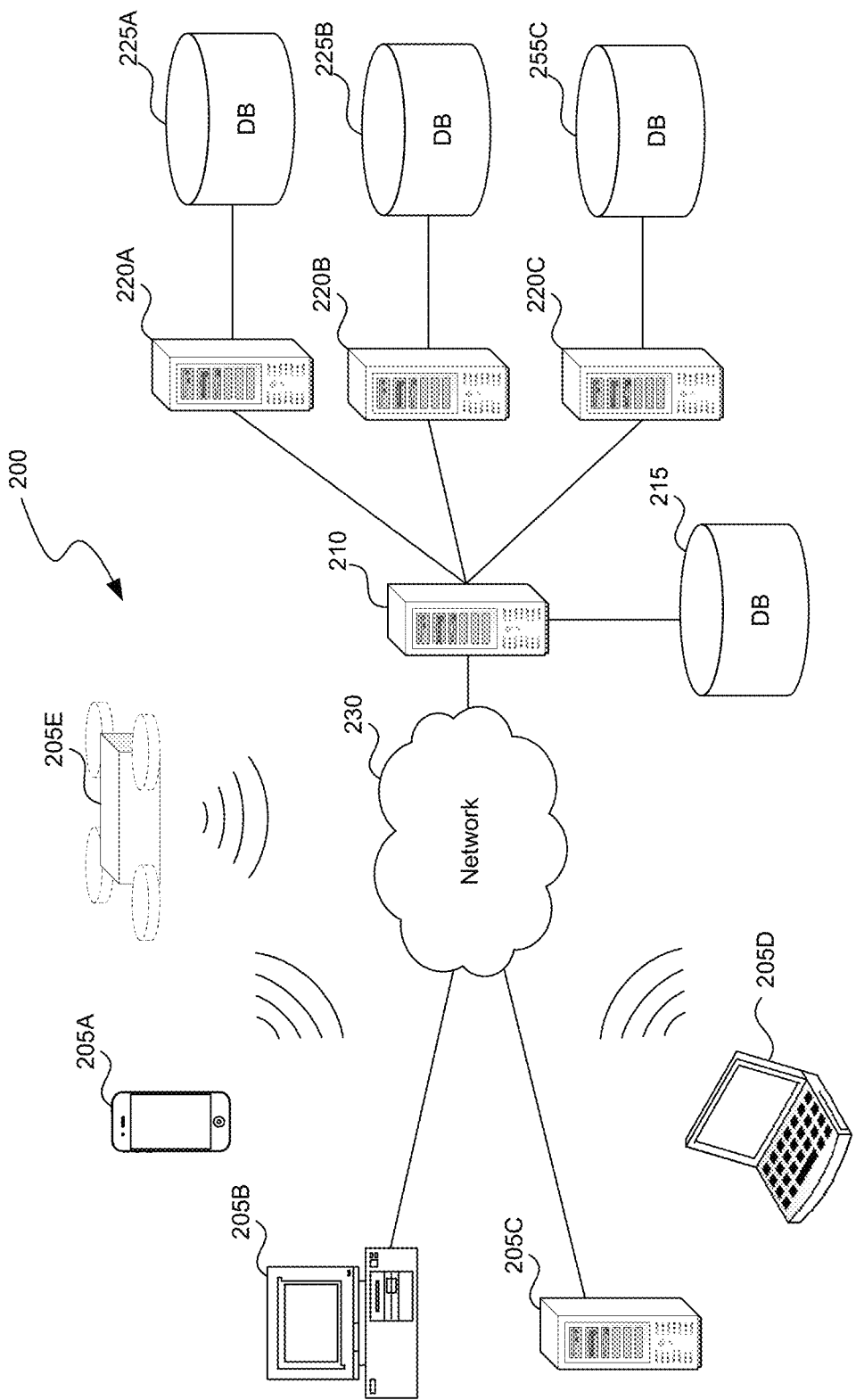
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-E, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as flight path data, drone position data, equipment data, sensor data, certification data, flight characteristic data, sensor data, image data, and automated flight data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
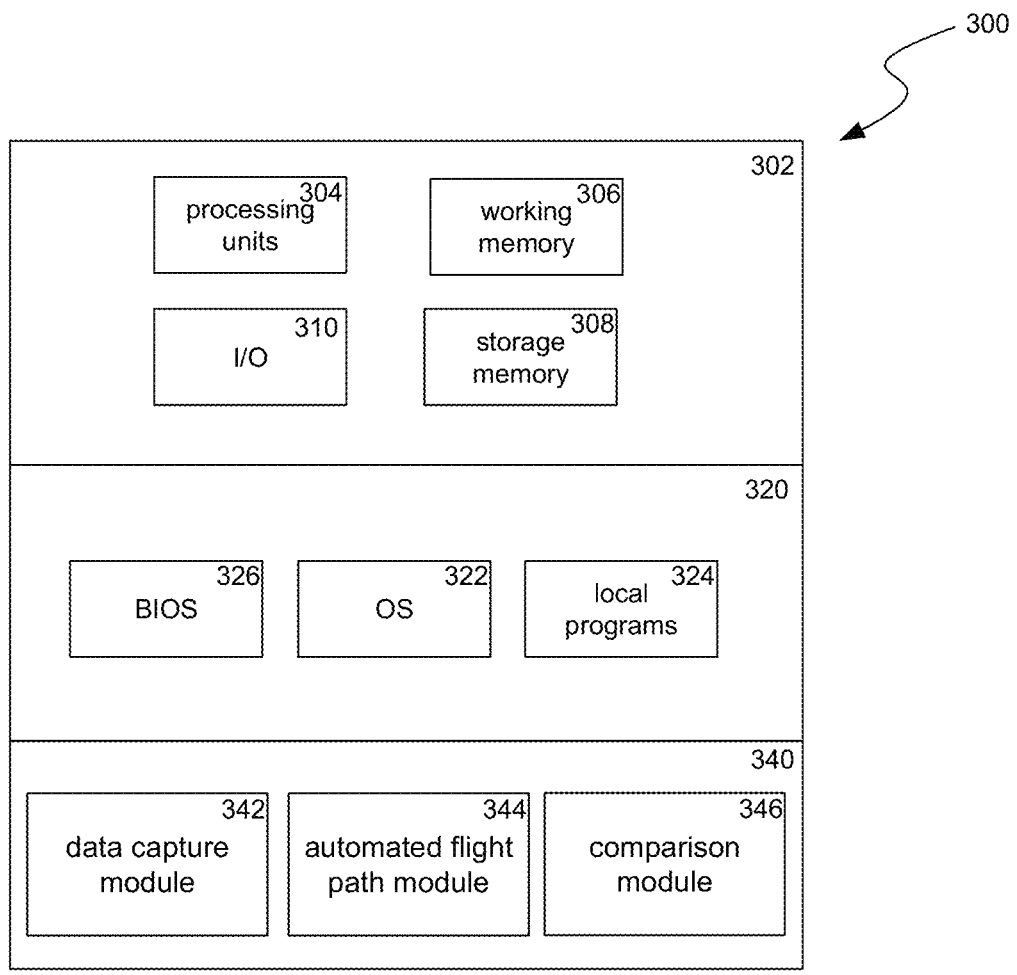
FIG. 3 is a block diagram illustrating components which, in some implementations, can be used in a system employing the disclosed technology.

FIG. 3 is a block diagram illustrating flight automation manager 300 which, in some implementations, can be used in a automated flight path management system employing the disclosed technology. The flight automation manager 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Flight automation manager 300 can be implemented in a client computing device such as client computing devices 205 or on a server computing device, such as server computing device 210 or 220. flight automation manager 300 can connect to a wide area network (WAN) to communicate with individual machines, and/or is encompassed within the machine itself.

General software 320 can include various applications including an operating system 322, local programs 324, and a basic input output system (BIOS) 326. Specialized components 340 can be subcomponents of a general software application 320, such as local programs 324. Specialized components 340 can include data capture module 342, automated flight path module 344, comparison module 346, and components which can be used for providing user interfaces, transferring data, and controlling the specialized components, such as interfaces for communications and sensor-specific functions. In some implementations, flight automation manager 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some embodiments, the data capture module 342 is configured to identify a starting position of a drone and capture sets of data describing attributes about a wireless communication site. The sets of data can include site data and flight data. For example, the data capture module 342 captures image data and measurement data (e.g., measuring the radio frequency signature of equipment) of the site, in addition to capturing flight data (e.g., flight path, velocity, orientation, windspeed, weather, flight route, etc.) of the drone. The data capture module 342 can capture the data continually (e.g., streaming video footage) or periodically (e.g., capturing an image after a threshold of time, such as every second). Additional details on the capturing data are provided below in relation to block 406 of FIG. 4, block 502 of FIG. 5, and block 610 of FIG. 6.

In some embodiments, the automated flight path module 344 is configured to generate data representing an automated flight path based on captured data of a flight path. The automated flight path data includes control data for navigating a drone autonomously in a site. In some cases, the automated flight path data includes the flight pattern of the drone (e.g., counterclockwise, or clockwise around the site, starting from the bottom of the site and spiraling upwards, starting from the top and spiraling downwards, etc.) The automated flight path can be a gimbal angle around the site and adjust for rate and angle of ascent decent of the drone while the drone captures data. The automated flight path module 344 can adjust the flight path based on abnormalities encountered during the flight, such as weather, lightning, wind, rain, or snow. In some cases, the automated flight path module 344 can adjust the data for the automated flight based on the flight characteristics of the drone. For example, if the drone is a different size or type of drone than the drone that logged the flight data for the automated flight path, the automated flight path module 344 can adjust the speed of the drone, angle of capturing data, the rate of capturing images, measuring data, or the rate of ascent or descent, to accommodate the different size or type of drone. Additional details on the flight automation are provided below in relation to block 504 of FIG. 5.

In some embodiments, the comparison module 346 is configured to compare the set of data captured during the automated flight to a proposed wireless communication site plan. The comparison module 346 can determine variations between the captured data from the automated flight and a proposed site plan for construction approval. In some cases, the proposed site plan can generate the proposed site plan using previously captured site data and site additions (added equipment or structures) from a user. If the captured data from the automated flight is within a predefined tolerance from the proposed site plan, the comparison module 346 can approve the proposed site plan and transmit a certification for the site proposal. Additional details on the data comparison are provided below in relation to FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
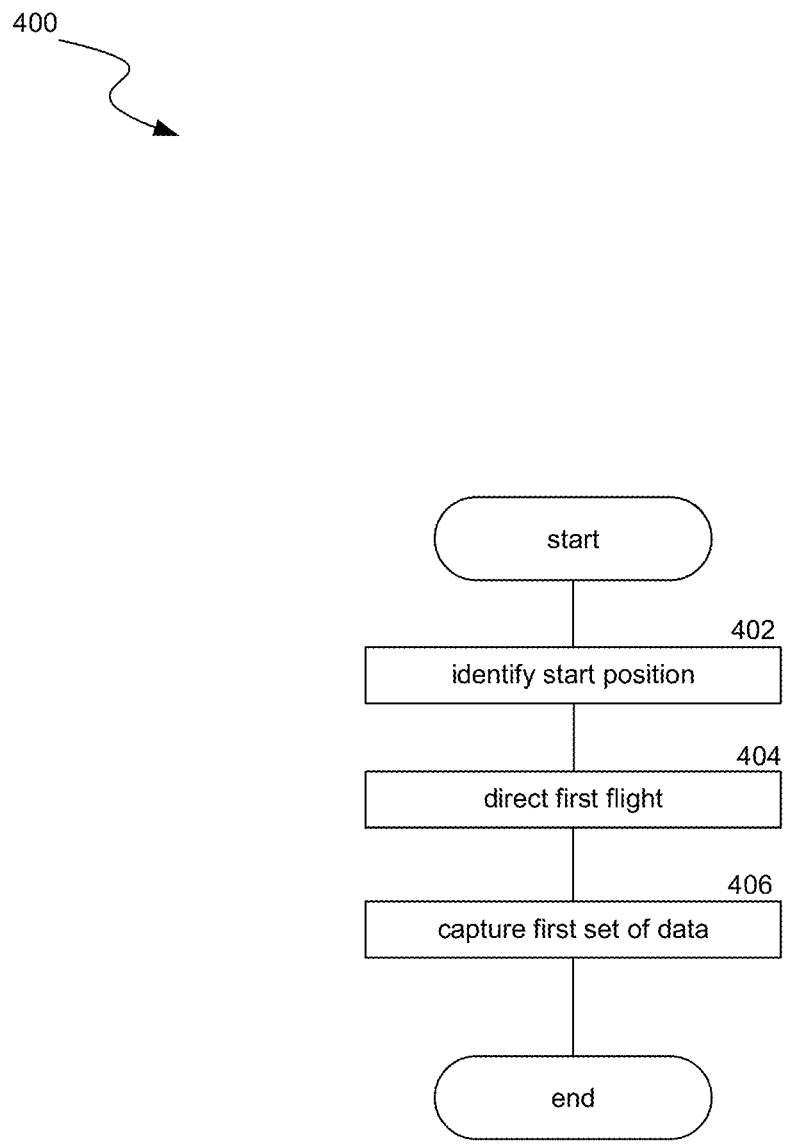
FIG. 4 is a flow diagram illustrating a process used in some implementations for capturing a drone flight path.

FIG. 4 is a flow diagram illustrating a process 400 used in some implementations for capturing a drone flight path. In a preferred embodiment, process 400 is triggered by a user (e.g., drone pilot, technician, site inspector, engineer, mechanic, etc.) powering on a drone, uploading the captured data from a drone flight to a database (or web portal), streaming the captured data to a database during a drone flight, streaming captured data on a device while the user physically performs a site walk, a drone flying within a threshold distance of a site, or the geolocation of the drone being at the site. In various implementations, process 400 is performed locally on the user device or performed by cloud-based device(s) that can support capturing a drone flight path.

At block 402, process 400 identifies a starting position for a flight path of a drone. The starting position can be a designated spot (e.g., structure, concrete pad, labeled location on the ground, etc.) in or nearby the site that drones are placed to begin a flight. The starting position can be a predetermined geolocation (e.g., GPS coordinates) for each site. In some cases, the drones are programmed to navigate to the starting position once the drones are powered on. In other cases, the drone can fly around the site until it identifies the starting position based on the starting position location, layout or structure. The starting position can be the position from which the first flight at a site began.

Figure 8:
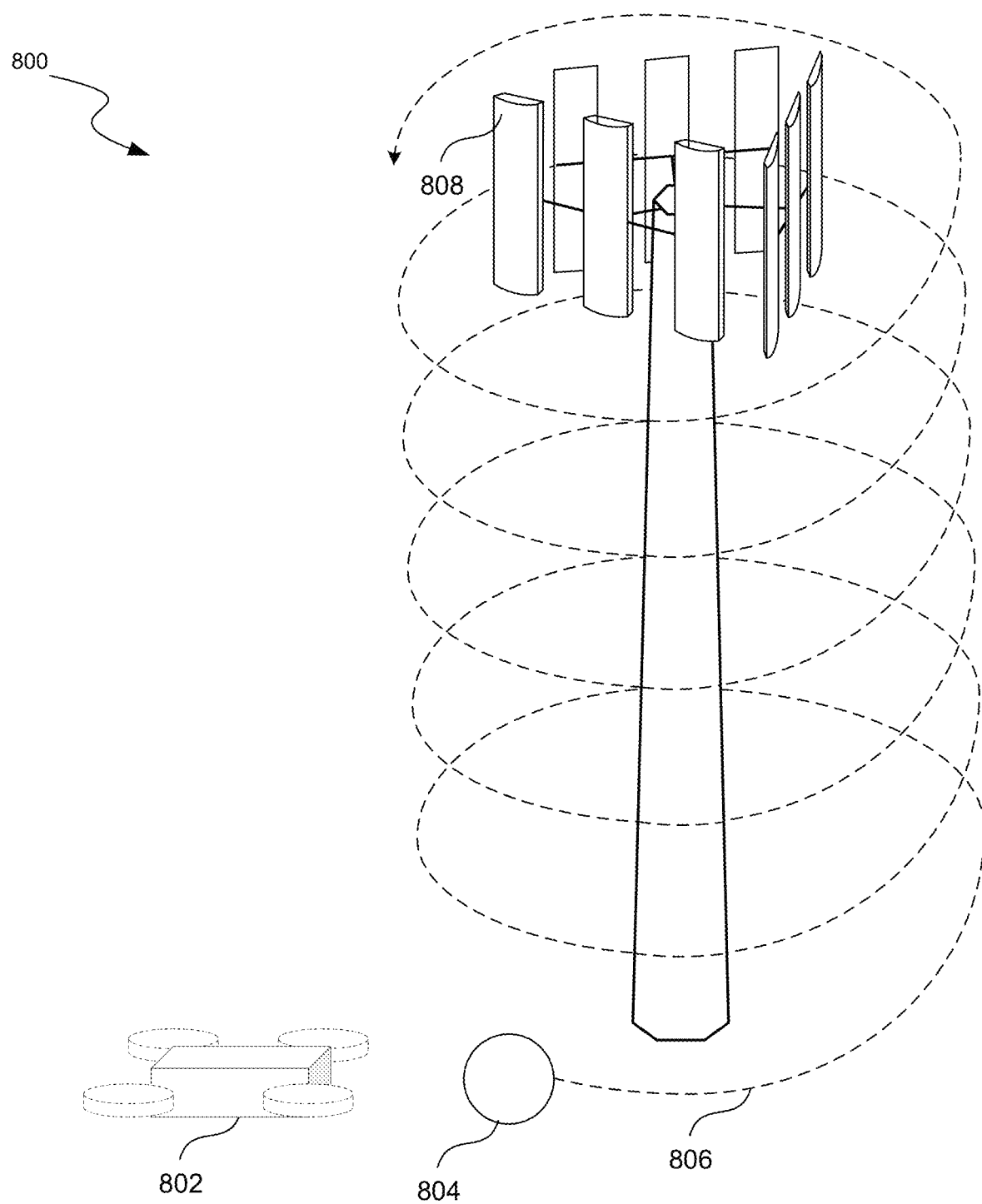
FIG. 8 is a diagram illustrating an example of a drone flight path at a wireless communication tower.

At block 404, process 400 directs the flight of the drone along a flight path. For example, a user can navigate a drone, or any user device, throughout a site. A "site" as used herein, refers a location where equipment is installed for operation. A site can include, but not limited to, a wireless tower, building rooftop, substation, base stations, cell sites, or base transceiver stations. The drone can capture data (e.g., image or measurement data) from all directions of the equipment at the site or the topography of the site. "Equipment" as used herein, refers an apparatus, asset, instrument, or similar, which performs a function or operation. Equipment can include, but not limited to, antennas, transmitters, receivers, digital signal processors, control electronics, GPS devices, primary electrical power source, backup electrical power source, sheltering, transformers, lights, etc. The site scan by the drone can identify equipment, potential locations for equipment, or equipment that needs to be replaced (e.g., due to failure or weather damage). The flight path of a drone can be any flight pattern that allows the drone to capture data (images or measurements) from different positions around a site. For example, FIG. 8 illustrates example 800 in which drone 802 navigates from starting position 804 along a flight path 806 around the wireless tower 808. The flight path can be any pattern such as a vortex shape, a circular pattern, cone shape pattern, or a clockwise or counterclockwise flight path. The flight path can have a starting position at the ground level of the site, the top of the site, or at any spot along the site.

At block 406, process 400 captures a first set of data describing one or more attributes about the wireless communication site. In a preferred embodiment, the drone connects to attachments, such as sensing devices (e.g., 2D or 3D cameras, infrared cameras, radio frequency (RF) measuring instruments, electromagnetic frequency measuring instruments, RF meters, range finders, geolocation, motion sensors, temperature sensors, vibration or tilt sensors, etc.), which capture data (e.g., flight instrumentation data, starting position data, control data, flightpath data, wind velocity data, sensor data, image data, video data, weather data, ascent of the drone data, descent of the drone data, structural-image recognition data, or geolocation data) about the flight of the drone or attributes of the site, such as equipment or structures in the site. The attributes of the site can include the measurements of signals, RF signature of equipment, power levels, structural layout of the site, or equipment in the site.

Figure 5:
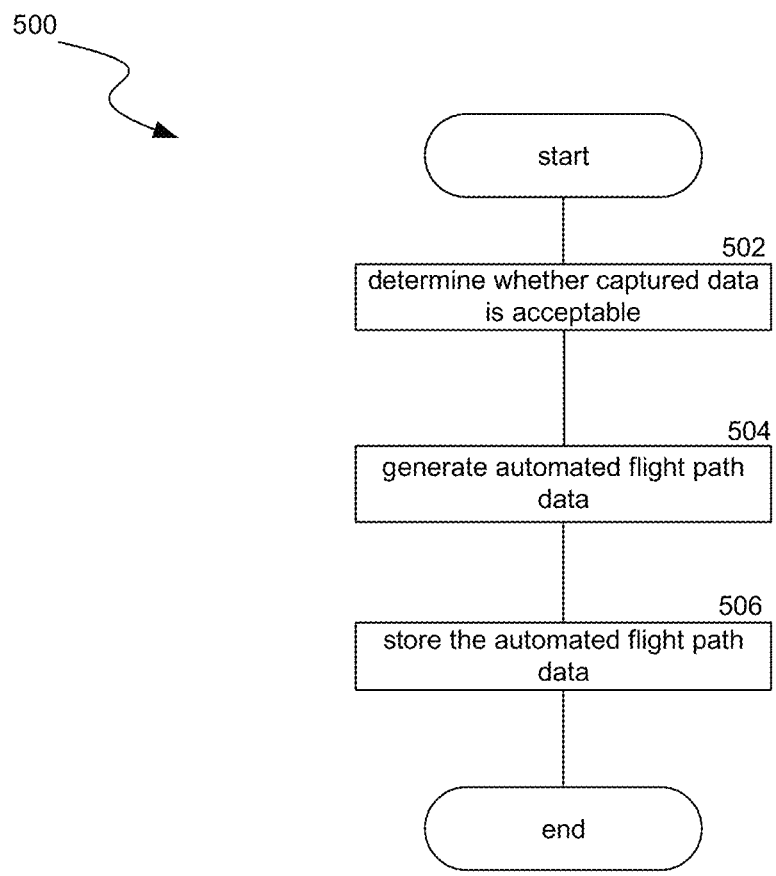
FIG. 5 is a flow diagram illustrating a process used in some implementations for storing a drone flight path.

FIG. 5 is a flow diagram illustrating a process 500 used in some implementations for storing a drone flight path. In a preferred embodiment, process 500 is triggered by a user (e.g., drone pilot, technician, site inspector, engineer, mechanic, etc.) powering on a drone, uploading the captured data from a drone flight to a database (or web portal), streaming the captured data to a database during a drone flight, streaming captured data on a device while the user physically performs a site walk, a drone flying within a threshold distance of a site, or the geolocation of the drone being at the site. In various implementations, process 500 is performed locally on the user device or performed by cloud-based device(s) that can support storing a drone flight path.

At block 502, process 500 determines whether the captured data is acceptable. In some cases, process 500 determines if the image data of the site is above a threshold quality level (e.g., a resolution of 300 pixels/inch). In other cases, process 500 determines if the captured data includes accurate measurements (e.g., measurements within an operating threshold) of the equipment at the site. In other cases, process 500 can determine if the captured data includes enough data to generate an automated fight path. For example, process 500 verifies if the data includes some or all of flight instrumentation data, control data, flightpath data, wind velocity data, sensor data, image data, ascent of the drone data, descent of the drone data, structural-image recognition data, or geolocation data, to generate an automated flight path.

At block 504, process 500 generates data representing an automated flight path based on the captured data of the drone. Process 500 processes the captured data to generate the automated flight path for future use. The data representing the automated flight can include control data for navigating the drone along the flight path. In some implementations, the automated flight path data includes the velocity, angle of ascent/decent, starting position, rate at which to capture data (e.g., images, measurements, or flight data), or flight time. The automated flight path can include the starting position and path the drone navigates around a site. FIG. 8 illustrates example 800 in which drone 802 navigates from starting position 804 along a flight path 806 (autonomous flight path) around the wireless tower 808. The flight path can be any pattern such as a vortex shape, a circular pattern, cone shape pattern, or a clockwise or counterclockwise flight path. The flight path can have a starting position at the ground level of the site, the top of the site, or at any spot along the site. At block 506, process 500 stores the data representing the automated flight path for a future flight. In some implementations, process 500 stores the captured data and the automated flight data on user devices or cloud-based devices. The data can be retrieved at any time for a flight or a site inspection.

Figure 6:
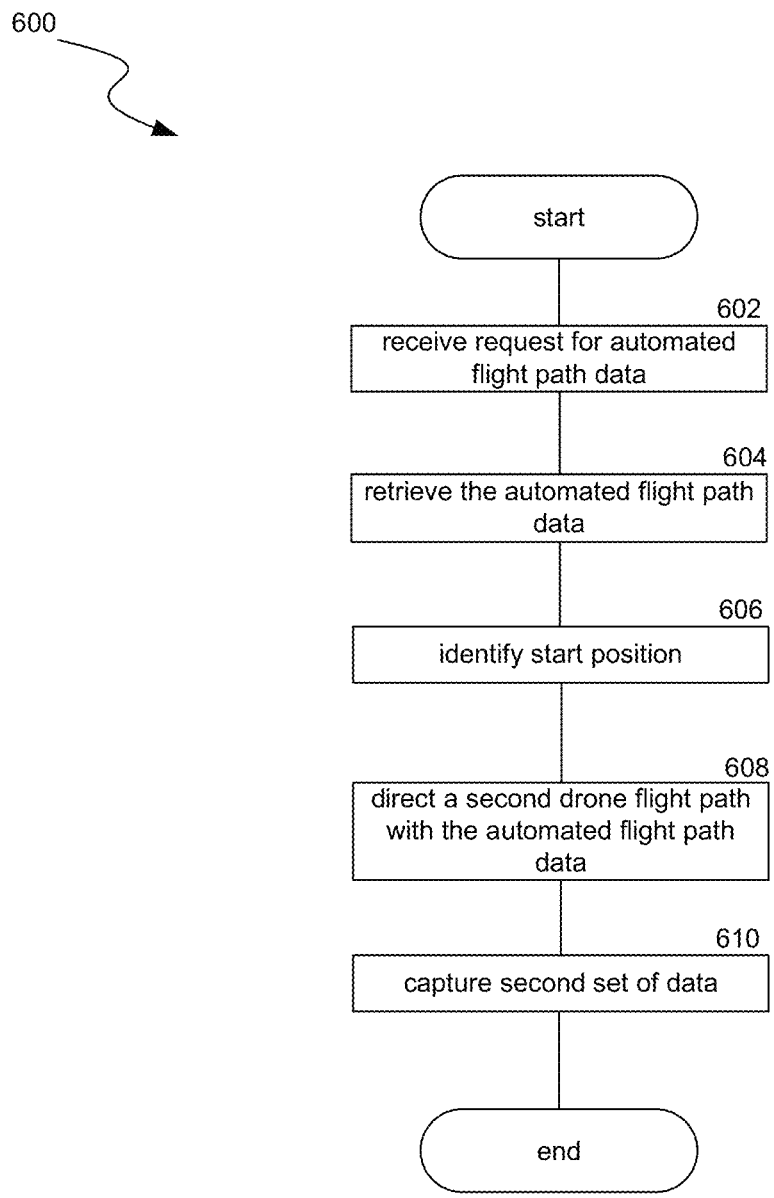
FIG. 6 is a flow diagram illustrating a process used in some implementations for retrieving a drone flight path.

FIG. 6 is a flow diagram illustrating a process 600 used in some implementations for retrieving a drone flight path. In a preferred embodiment, process 600 is triggered by a user (e.g., drone pilot, technician, site inspector, engineer, mechanic, etc.) powering on a drone, uploading the captured data from a drone flight to a database (or web portal), streaming the captured data to a database during a drone flight, streaming image data on a device while the user physically performs a site walk, a drone flying within a threshold distance of a site, or the geolocation of the drone being at the site. In various implementations, process 600 is performed locally on the user device or performed by cloud-based device(s) that can support retrieving a drone flight path.

At block 602, process 600 receives a request for automated flight path data. A user can send the request for the automated flight data before a flight of a drone at the site. In some cases, the request is automatically sent when the drone is within a threshold distance of the site or at the site. At block 604, process 600 retrieves the data representing the automated flight path. Process 600 can retrieve the automated flight path data from a cloud-based storage device or any device containing the automated flight data.

At block 606, process 600 identifies the start position for the flight path. Process 600 can have the drone perform a scan of the site to identify the start position. In some cases, the start position is a predetermined geolocation that the drone navigates to. In other cases, the user places the drone on the start position and process 600 verifies that the location of the drone matches the geolocation of the recorded start position for automated flights.

At block 608, process 600 directs the drone along a flight path based on the automated flight path data. The automated flight path can be the same flight path that was logged from an earlier flight. In some implementations, process 600 adjusts the data representing the automated flight path based on flight characteristics of the drone. For example, if the drone performing the automated flight is a different size or type of drone than the drone that logged the data to generate for the automated flight, process 600 adjusts the flight path so that the different drone collects the same type of data from the site.

At block 610, process 600 captures the second set of data of the site while flying along the automated flight path. For example, process 600 captures a second set of data describing one or more attributes about the wireless communication site. In a preferred embodiment, the drone connects to attachments, such as sensing devices (e.g., 2D or 3D cameras, infrared cameras, radio frequency (RF) measuring instruments, electromagnetic frequency measuring instruments, RF meters, range finders, geolocation, motion sensors, temperature sensors, vibration or tilt sensors, etc.), which capture data (e.g., flight instrumentation data, starting position data, control data, flightpath data, wind velocity data, sensor data, image data, video data, weather data, ascent of the drone data, descent of the drone data, structural-image recognition data, or geolocation data) about the site, equipment in the site, and flight of the drone. The second set of data can be different or the same type of data as the first set of data captured at block 406 of FIG. 4. In some cases, the first and second set of data are compared to identify differences in the site based on the captured data. For example, an inspector can capture and review the data to identify failed or damaged equipment, areas to improve at the site, structural repairs, or measurements of equipment.

Figure 7:
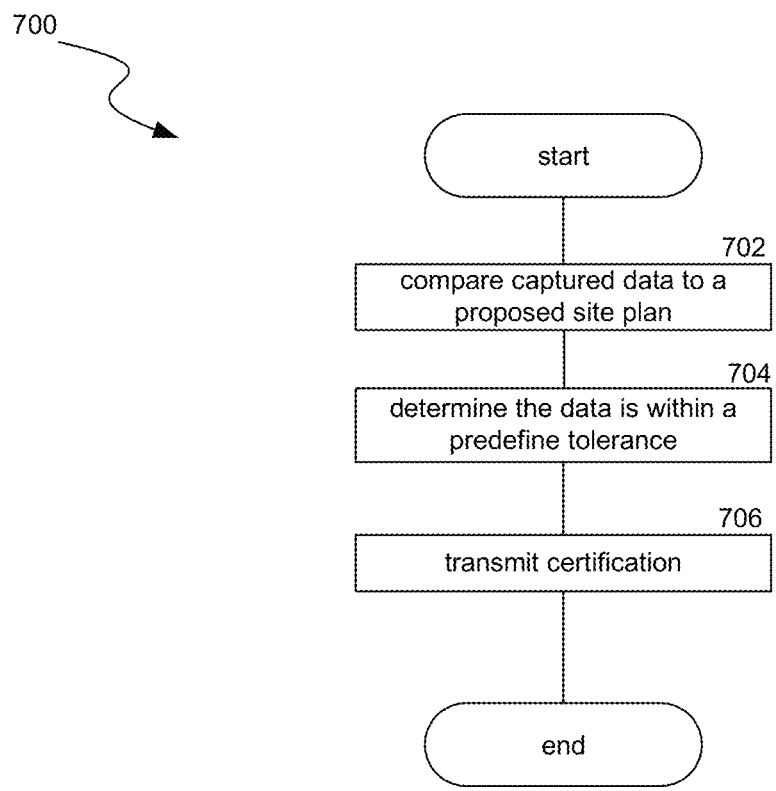
FIG. 7 is a flow diagram illustrating a process used in some implementations for certifying a site.

FIG. 7 is a flow diagram illustrating a process 700 used in some implementations for certifying a site. In a preferred embodiment, process 700 is triggered by a user (e.g., drone pilot, technician, site inspector, engineer, mechanic, etc.) powering on a drone, uploading the captured data from a drone flight to a database (or web portal), streaming the captured data to a database during a drone flight, streaming captured data on a device while the user physically performs a site walk, requesting a certification of a site from a licensing authority, a drone flying within a threshold distance of a site, or the geolocation of the drone being at the site. In various implementations, process 700 is performed locally on the user device or performed by cloud-based device(s) that can support certifying a site.

Process 700 can use the captured data of the site to generate a virtual representation (e.g., 3D virtual model, panorama view, or 3D site view). The virtual representation of the site includes the equipment installed at the site, building structures, fences, roads, topography of the site, site identification features, site address, or geolocation coordinates of the site. Process 700 can identify, at the site, the type of equipment, the equipment owner/manufacturer (e.g., by accessing public databases to retrieve the information), the size/dimensions of the equipment, the distance between the equipment and other equipment or structures/objects, the type of tower (self-supporting towers, monopole, guyed, etc.), dimensions of the site, tower height, RAD height availability, space availability for additional equipment, antennas on the building or tower, ground compound at the site, fiber vault location, H-frame/gang member location, transformer/utility pole location, migratory bird flag at the site, safety signage, active FM antennas, safety hazards, site access, wildlife, vault outside of the site, view of right of way, paths for power/fiber conduits, closest right of way for accessing/crossing over the site, RAD height panorama view with azimuth interface, keyhole markup language zipped (KMZ) from fiber providers, near map integration, or path profile. In some cases, process 700 identifies obstructions (e.g., buildings, hills, mountains, trees, etc.) in and around the site that could interfere with transmissions in and out of the site. In other cases, process 700 identifies a centerline of the site or the centerline view of near-field obstructions or clutter. Process 700 can provide in the virtual representation a panorama view of the site with azimuths (e.g., a horizon view facing outwards from the site to the horizon or including a bar with the azimuth of the direction facing view.). Process 700 can include ground photo enhancements (e.g., an embedded photo with detail of fiber vaults, transformers, H-frame/gang meter, or the nearest utility pole) in the virtual representation. In some implementations, process 700 converts the virtual representation into a construction drawing (e.g., CAD drawing, architectural drawings, structural drawings, electrical drawings, etc.). In some cases, process 700 provides RF verification of equipment by performing emissions studies using the data captured by the drone Process 700 can display the virtual representation as a desktop tool on a user interface that users can access, perform virtual site walks, or propose site plans. In some embodiments, process 700 virtually makes modifications to structures at the site, installs (e.g., adds the equipment in the 3D model) equipment in the virtual representation of the site, and generates virtual equipment measurements in the proposed site plan. For example, the proposed site plan has the virtual representation of the site display a projection of the proposed location/space where the equipment will be physically installed at the site.

Process 700 can send the proposed site plan, to a permitting authority (e.g., fire department, inspector, licensing authority, city authority, etc.) to receive approval for the construction or changes made to the site (e.g., installation of new equipment at a proposed location/position in the site). In some cases, process 700 uploads the virtual representation of the site to the permitting authority database or web portal. Process 700 can convert the virtual representation into a construction drawing (e.g., CAD drawing, architectural drawings, structural drawings, electrical drawings, etc.) before submitting the virtual representation to the permitting authority. The permitting authority can review the virtual model of the proposed site plan, without a physical site visit. For example, the permitting authority virtually inspects the positioning of the proposed new equipment to determine if the size and type of equipment meets the standards/regulations at the site.

At block 702, process 700 compares the captured data from the automated flight to a proposed site plan. For example, process 700 displays an image with proposed network equipment superimposed upon an existing image of the site. In some cases, process 700 compares data measurements of the site to the proposed measurements in the proposed site plan. In other cases, process 700 compares the image data captured by the drone to the proposed site plan to identify similarities and differences between what is physically at the site and the proposed site plan. Process 700 can process the captured data from the automated flight and generate a second virtual representation of the site with the implemented changes from the proposed site plan.

At block 704, process 700 determines whether the captured data is within a predefined tolerance of the proposed site plan. For example, Process 700 overlays the second virtual representation on the proposed site plan to verify, to the permitting authority, the changes were made (e.g., equipment was physically installed in the proposed location) according to the proposed plan. Overlaying can include layering one image over another, substituting elements from an image within another image, or generating an overlaid image (versus providing image layers). In some implementations, overlaying the image of the installed equipment on the model of the approved plan, highlights any differences or variances from the approved plan when submitting verification to the permitting authority. In some cases, process 700 transmits (uploads) the captured data or the second virtual representation to the permitting authority to verify the site changes were made in compliance with regulations. The permitting authority can inspect the second virtual representation of the site to determine if the site changes are in violation of any regulations or codes. In some cases, process 700 sends a variance report to the permitting authority that shows a difference between the captured data and the proposed site plan. In other cases, a third-party approves, on behalf of the permitting authority, the compliance with the proposed plan versus the physical site. At block 706, process 700 transmits a certification of the site based on the captured data of the automated flight being within the predefined tolerance of the proposed site plan. For example, a site inspector can approve a site based on the captured data. In some implementations, process 700 receives the certification from a permitting authority based on the captured data being within a tolerance to the proposed site plan.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for drone flight automation at a wireless communication site, the method comprising:
    identifying a starting position of a first drone for a first flight;
    directing the first flight of the first drone along a first flight path;
    during the first flight, capturing a first set of data describing one or more attributes about the wireless communication site;
    generating data representing an automated flight path based on the first flight path of the first flight;
    performing a second flight with a second drone using the starting position and the automated flight path, wherein the second drone is different than the first drone;
    adjusting a speed of the second drone or an angle of capturing data on the automated flight path based on a size or a type of the second drone, wherein the automated flight path is the same flight path as the first flight path; and
    capturing a second set of data describing the one or more attributes about the wireless communication site during the second flight along the automated flight path.

2. The method of claim 1, further comprising:
    determining whether the first flight path is acceptable based on the captured first set of data; and
    in response to determining the first flight path is acceptable, generating the data representing the automated flight path; and
    storing the data representing the automated flight path for the second flight.

3. The method of claim 1, wherein the data representing the automated flight path includes control data for controlling the second drone in the automated flight path.

4. The method of claim 1, wherein the starting position for the second flight is approximated from data indicating a location of the starting position.

5. The method of claim 1, wherein performing the second flight further comprises:
    retrieving the data representing the automated flight path; and
    directing the second flight of the second drone along the automated flight path.

6. The method of claim 1, further comprising:
    comparing the second set of data to a proposed wireless communication site plan, where the proposed wireless communication site plan includes the one or more attributes about the wireless communication site;

determining the second set of data is within a predefined tolerance to the proposed wireless communication site plan; and transmitting a certification for the proposed wireless communication site plan based on the second set of data being within the predefined tolerance.

7. A computing system for drone flight automation at a wireless communication site, the computing system comprising:
one or more processors; and
one or more memories storing instructions that, when executed by the one or more processors, cause the computing system to perform a process comprising:
identifying a starting position of a first drone for a first flight;
directing the first flight of the first drone along a first flight path;
during the first flight, capturing a first set of data describing one or more attributes about the wireless communication site;
generating data representing an automated flight path based on the first flight path of the first flight;
performing a second flight with a second drone using the starting position and the automated flight path, wherein the second drone is different than the first drone;
adjusting a speed of the second drone or an angle of capturing data on the automated flight path based on a size or a type of the second drone, wherein the automated flight path is the same flight path as the first flight path; and
capturing a second set of data describing the one or more attributes about the wireless communication site during the second flight along the adjusted automated flight path.

8. The computing system of claim 7, wherein the process further comprises:
determining whether the first flight path is acceptable based on the captured first set of data; and
in response to determining the first flight path is acceptable, generating the data representing the automated flight path; and
storing the data representing the automated flight path for the second flight.

9. The computing system of claim 7, wherein the data representing the automated flight path includes control data for controlling the second drone in the automated flight path.

10. The computing system of claim 7, wherein the starting position for the second flight is approximated from data indicating a location of the starting position.

11. The computing system of claim 7, wherein the process of performing the second flight further comprises:
retrieving the data representing the automated flight path; and
directing the second flight of the second drone along the automated flight path.

12. The computing system of claim 7, wherein the process further comprises:
comparing the second set of data to a proposed wireless communication site plan, where the proposed wireless communication site plan includes the one or more attributes about the wireless communication site;
determining the second set of data is within a predefined tolerance to the proposed wireless communication site plan; and
transmitting a certification for the proposed wireless communication site plan based on the second set of data being within the predefined tolerance.

13. A non-transitory computer-readable medium storing instructions that, when executed by a computing system, cause the computing system to perform operations for drone flight automation at a wireless communication site, the operations comprising:
identifying a starting position of a first drone for a first flight;
directing the first flight of the first drone along a first flight path;
during the first flight, capturing a first set of data describing one or more attributes about the wireless communication site;
generating data representing an automated flight path based on the first flight path of the first flight;
performing a second flight with a second drone using the starting position and the automated flight path, wherein the second drone is different than the first drone;
adjusting a speed of the second drone or an angle of capturing data on the automated flight path based on a size or a type of the second drone, wherein the automated flight path is the same flight path as the first flight path; and
capturing a second set of data describing the one or more attributes about the wireless communication site during the second flight along the adjusted-automated flight path.

14. The non-transitory computer-readable medium of claim 13, wherein the operations further comprise:
determining whether the first flight path is acceptable based on the captured first set of data; and
in response to determining the first flight path is acceptable, generating the data representing the automated flight path; and
storing the data representing the automated flight path for the second flight.

15. The non-transitory computer-readable medium of claim 13, wherein the operations further comprise:
comparing the second set of data to a proposed wireless communication site plan, where the proposed wireless communication site plan includes the one or more attributes about the wireless communication site;
determining the second set of data is within a predefined tolerance to the proposed wireless communication site plan; and
transmitting a certification for the proposed wireless communication site plan based on the second set of data being within the predefined tolerance.

16. The non-transitory computer-readable medium of claim 13, wherein the data representing the automated flight path includes control data for controlling the second drone in the automated flight path.

17. The non-transitory computer-readable medium of claim 13, wherein the starting position for the second flight is approximated from data indicating a location of the starting position.

18. The method of claim 1, further comprising generating a three-dimensional virtual model of the wireless communication site using the first set of data, wherein the three-dimensional virtual model is accessible via a web browser interface.

19. The method of claim 1, wherein the wireless communication site comprises a cellular tower, and wherein the first set of data and second set of data each comprise RF signature measurements of equipment at the cellular tower.

20. The computing system of claim 7, wherein the process further comprises:
  generating a three-dimensional virtual model of the wireless communication site using the first set of data, the three-dimensional virtual model being accessible via a web browser interface.

* * * * *